United States Patent
John et al.

(10) Patent No.: US 11,870,741 B2
(45) Date of Patent: *Jan. 9, 2024

(54) SYSTEMS AND METHODS FOR A METADATA DRIVEN INTEGRATION OF CHATBOT SYSTEMS INTO BACK-END APPLICATION SERVICES

(71) Applicant: Oracle International Corporation, Redwood Shores, CA (US)

(72) Inventors: Jeevan Selvan Job John, Bangalore (IN); Mudit Gupta, Bangalore (IN); Aswin Jose, Kottayam (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,159

(22) Filed: Feb. 24, 2023

(65) Prior Publication Data

US 2023/0208787 A1 Jun. 29, 2023

Related U.S. Application Data

(63) Continuation of application No. 16/598,901, filed on Oct. 10, 2019, now Pat. No. 11,637,792.

(30) Foreign Application Priority Data

Apr. 19, 2019 (IN) .............................. 201941015683

(51) Int. Cl.
*G06F 9/44* (2018.01)
*G06F 3/0484* (2022.01)
(Continued)

(52) U.S. Cl.
CPC ............ *H04L 51/02* (2013.01); *H04L 51/046* (2013.01); *H04L 67/133* (2022.05)

(58) Field of Classification Search
CPC ..... H04L 51/02; H04L 51/046; H04L 67/133; H04L 67/51
See application file for complete search history.

(56) References Cited

U.S. PATENT DOCUMENTS 10,009,465 B1 * 6/2018 Fang ...................... G10L 21/10
10,490,186 B2 * 11/2019 Gelfenbeyn ............ G10L 15/22
(Continued)

OTHER PUBLICATIONS

Option 2: API Hosted in Peoplesoft, Oracle, PeopleSoft, 2018, 1 page.

(Continued)

*Primary Examiner* — Kevin T Bates
*Assistant Examiner* — Golam Mahmud
(74) *Attorney, Agent, or Firm* — Kilpatrick Townsend & Stockton LLP

(57) ABSTRACT

The present disclosure generally relates to systems and methods for efficiently and dynamically integrating a chatbot into an application service. More specifically, the present disclosure relates to systems and methods that dynamically build custom components that enable the chatbot to communicate and facilitate the use of the application service directly from the chatbot application. Accordingly, the systems and methods described herein provide the benefit of integrating the chatbot application into an application service without having the application developer write code for the integration, thereby enhancing the computational efficiency of the integration and the reliability of the application service when new services or service functionality are added or modified.

20 Claims, 13 Drawing Sheets

(51) Int. Cl.
*H04L 12/58* (2006.01)
*H04L 51/02* (2022.01)
*H04L 51/046* (2022.01)
*H04L 67/133* (2022.01)

(56) References Cited

U.S. PATENT DOCUMENTS

| | | | | |
|---|---|---|---|---|
| 10,498,674 | B2* | 12/2019 | Sagar | H04L 67/1001 |
| 10,659,403 | B2* | 5/2020 | Smullen | H04L 67/61 |
| 10,680,986 | B1* | 6/2020 | Wu | H04L 51/043 |
| 10,817,265 | B2* | 10/2020 | Collins | H04L 51/02 |
| 11,012,384 | B2* | 5/2021 | Parekh | H04L 51/212 |
| 11,425,254 | B2* | 8/2022 | Mazza | G10L 15/1815 |
| 11,562,267 | B2* | 1/2023 | Polleri | G06F 40/40 |
| 2010/0070448 | A1* | 3/2010 | Omoigui | H01L 27/1463 |
| | | | | 706/55 |
| 2014/0122083 | A1* | 5/2014 | Xiaojiang | H04L 51/02 |
| | | | | 704/270.1 |
| 2015/0100943 | A1* | 4/2015 | Gabel | G06F 40/20 |
| | | | | 717/106 |
| 2016/0259767 | A1* | 9/2016 | Gelfenbeyn | G06F 8/20 |
| 2016/0349935 | A1* | 12/2016 | Gelfenbeyn | G06Q 30/0601 |
| 2017/0019487 | A1* | 1/2017 | Maheshwari | H04L 67/51 |
| 2017/0147297 | A1* | 5/2017 | Krishnamurthy | G06F 8/71 |
| 2017/0230312 | A1* | 8/2017 | Barrett | H04L 51/02 |
| 2018/0212904 | A1* | 7/2018 | Smullen | H04L 51/04 |
| 2018/0322380 | A1* | 11/2018 | Aggarwal | G06N 20/00 |
| 2019/0066674 | A1* | 2/2019 | Jaygarl | G10L 15/22 |
| 2019/0179608 | A1* | 6/2019 | Kothari | G10L 15/1815 |
| 2019/0182184 | A1* | 6/2019 | Myung | H04L 51/02 |
| 2019/0347326 | A1* | 11/2019 | Kozhaya | G06F 40/30 |
| 2020/0143797 | A1* | 5/2020 | Manoharan | G10L 15/22 |
| 2020/0150839 | A1* | 5/2020 | Roisman | G06F 16/3329 |
| 2020/0374244 | A1 | 11/2020 | John et al. | |
| 2021/0081836 | A1* | 3/2021 | Polleri | G06F 18/2115 |

OTHER PUBLICATIONS

U.S. Appl. No. 16/598,901, Final Office Action dated Jan. 6, 2022, 18 pages.
U.S. Appl. No. 16/598,901, Non-Final Office Action dated Jun. 3, 2021, 13 pages.
U.S. Appl. No. 16/598,901, Non-Final Office Action dated Jun. 2, 2022, 18 pages.
U.S. Appl. No. 16/598,901, Notice of Allowance dated Dec. 14, 2022, 9 pages.
John, Dynamic Chatbot Components for PSC/PSCR, ALM Confluence, Nov. 23, 2018, 2 pages.
John, High Level Design—Peoplesoft Chatbot Integration Framework, ALM Confluence, Jan. 23, 2019, 9 pages.

* cited by examiner

SYSTEMS AND METHODS FOR A METADATA DRIVEN INTEGRATION OF CHATBOT SYSTEMS INTO BACK-END APPLICATION SERVICES

CROSS-REFERENCE TO RELATED APPLICATIONS

This application is a continuation of U.S. patent application Ser. No. 16/598,901 (allowed), filed Oct. 19, 2019, titled "Systems and Methods for a Metadata Driven Integration of Chatbot Systems into Back-End Application Services," which claims the priority benefit of Indian Patent Application No. 201941015683, filed on Apr. 19, 2019. Each of these applications is hereby incorporated by reference in its entirety for all purposes.

TECHNICAL FIELD

The present disclosure generally relates to systems and methods for efficiently and dynamically integrating a chatbot into an application service. More specifically, the present disclosure relates to systems and methods that dynamically build custom components that enable the chatbot to interact with an application service from a dialogue flow.

BACKGROUND

Often, digital assistants are hosted on a cloud-based platform. For example, a digital assistant may be a chatbot that is deployed on a messaging channel available on a web browser operating on a client device. Digital assistants are useful as a stand-alone platform, however, integrating digital assistants into existing cloud-based applications is promising. However, integrating digital assistants into existing cloud-based applications is a technical challenge because digital assistants cannot directly call services of the application from a dialogue flow. To integrate a digital assistant into an existing service of an existing application, developers have to write code (usually in JavaScript) for each service of the application that enables the chatbot to communicate with the application service. To write the code, the developers would first need to search for and identify all of the parameters that can be processed by the service. The number of services available within an application can be very large, and thus, integrating a chatbot into an existing application can be technically burdensome and inefficient. Additionally, if new services are created or if a service is modified, developers would need to re-write the code for each service to enable the chatbot to make use of the new or modified service.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Integrating a digital assistant or a chatbot hosted on a cloud-based platform into an existing service of an application is technically challenging. For instance, the chatbot may be configured as a stand-alone platform, and thus, the chatbot may not be configured to invoke or make calls to the REST (Representational State Transfer) service of the application from a dialogue flow. That is, the chatbot is not configured with the information needed to invoke calls to the back-end system of an application service. To interact with the back-end system of the application service, developers have to manually write JavaScript code for each service that enables the chatbot to call the application service and pass variables to the application service for processing. This is a significant technical challenge because a given application may have a large number of services (e.g., 100 or more services), and only a subset of those services may be coded to enable the chatbot to invoke the REST service(s) of the application from a dialogue flow (e.g., from a conversation or communication session between the end user and the chatbot).

Certain embodiments of the present disclosure include systems and methods that solve the technical challenge described above. Certain embodiments of the present disclosure include systems and methods that integrate a chatbot into an existing application by dynamically building custom components that enable the chatbot to call each of an application's REST services directly from a dialogue flow. A dialogue flow may include executable code that, when executed, causes the chatbot application to communicate with an end user. For example, the dialogue flow may include the code underlying the conversation that the chatbot is configured to undertake with the end user. Certain embodiments include automatically creating a custom component (e.g., a JavaScript component configured to make REST calls) that can interact with the back-end system of the application service to enable a user to invoke the application service directly from communicating with the chatbot. The custom component may enable the chatbot to map an input parameter received from the user to a parameter of the application service. The custom component may build a payload, which includes the values for the input parameters needed to perform the service. The payload can then be passed by the chatbot to the application service using the custom component generated for that application service.

As a non-limiting example, the dialogue flow may be configured to invoke an application service that searches for permits issued by a city. The chatbot may be triggered when a user selects a selectable element (e.g., a link or button presented in a native application or web service) displayed on a user device. The selection of the link may cause a chat window to open on the user device. The user may then be able to chat with a chatbot within the chat window. When the user is chatting with the chatbot, the cloud-based chatbot may detect the user's intent from the text of the conversation with the user. The detected intent may be to perform one or more functions provided by a service of a cloud-based application. However, in this case, the chatbot cannot invoke any services provided by the application unless the chatbot is integrated into the cloud-based application. Certain embodiments described herein include enabling the chatbot to be efficiently integrated into the cloud-based application by automatically generating a custom component using metadata associated with the service provided by the application. The automatically generated custom component may enable the chatbot to interact with the back-end system of the cloud-based application to perform the one or more functions desired by the user. For example, interacting with the back-end system of the cloud-based application may include matching input parameters that the user can provide to the chatbot with input parameters that the service is configured to process. In this example, the cloud-based application provides at least the functionality of searching for permits to the user who is communicating with the chatbot. The user can then indicate to the chatbot that the user seeks to search for permits. The chatbot can process the conversation with the user to determine that the user's intent is to invoke the permit searching functionality of the service. The chatbot can then execute the custom component that is coded into the dialogue flow to prompt the user for the input parameters that the service is configured to receive to perform the permit searching functionality. For example, the chatbot executing the custom component may cause the chatbot to prompt the user for the city for which the user wants to search permits because the "city" is a parameter that can be passed as an input into the service. Once the user provides a response, such as "San Francisco," the chatbot may then prompt the user for a permit type because "permit type" may be a parameter that can be passed as an input into the service. Then, the chatbot may prompt the user for a name to use for searching through the permits because "name" may be a parameter that can be passed as an input into the service. Once the chatbot has received the requested information from the user (e.g., the requested information as defined by the custom component that enables the chatbot to interact with the application service), then the chatbot can pass the three input parameters (e.g., a payload) to the application service for the service to search the available permits using the values of the three input parameters. The application service may generate an output, such as table of permits that satisfy the three input parameters. The application service may then transmit the search results back to the chatbot for presenting to the user in the chat window. Advantageously, the automatically generated custom component can be coded into the dialogue flow used by the chatbot, which enables the chatbot to directly invoke the application service with the correct input parameters.

A custom component may be generated for each action that is performable by the application's back-end services (e.g., a REST service). Non-limiting examples of actions may include creating, reading, updating, or deleting a record. The custom component may also include executable code that is configured to receive and store (as a conversation variable to potentially be displayed in a dialogue flow) a response from the service. For example, a custom component can be automatically generated to enable the chatbot to interact with the service to perform certain actions, including creating a record at the back-end service, getting a record from the back-end service, fetching multiple rows of data from the back-end service, and other suitable actions. In some implementations, the custom component can be dynamically generated by a component generator configured to automatically build the custom components that can be called by a chatbot. For example, the component generator can dynamically build custom components using metadata published by the existing application and a generic custom component. In some implementations, the metadata can include data indicating the input parameters and the output parameters for which the service is configured to receive and output, respectively. For example, an input parameter may include a variable type accepted by the service, such as, in the case of a service that can search for public permits, a variable that represents a "city" that is used as an input. The component generator can load the metadata and automatically generate the custom components needed for a particular service by automatically writing code (e.g., JavaScript) using the input parameters and the output parameters found in the metadata.

An application service may or may not be backed by a database. In some implementations, the application service may provide a describe endpoint URL (e.g., an ADF-BC describe endpoint) that, when accessed, provides access to a descriptive documents, for example, in the form of metadata. The describe endpoint may be provided regardless of whether the application is backed by a database. In cases where the describe endpoint is not backed by a database, the metadata describing the input and output parameters of the service may be coded into the application, and thus, an application not backed by a database would still have metadata that describes the associated services and the inputs or outputs for which the service is configured to process or generate. The metadata can describe the input parameters and the output parameters for which the application service is configured. The input parameters may represent a type of arguments or parameters (e.g., a string) that the service is configured to receive as inputs (and whether or not the input parameter is a required input for the service). The output parameters may also represent a type of arguments or parameters (e.g., a string) that the service is configured to generate as outputs. The component generator can access the describe endpoint by accessing the URL to retrieve and load the metadata. The component generator can then automatically build the custom components needed for the chatbot to invoke calls to the REST service by using the input parameters and the output parameters included in the metadata. In some implementations, the component generator may be a separate server from the cloud-based chatbot application. In other implementations, at least a part of the tasks performed by the component generator may be performed by a server of the cloud-based chatbot application (e.g., a node.js server).

In some implementations, the generation of custom components and the execution of the custom components may be two distinct steps. For example, the component generator may generate the custom components using describe metadata (retrieved from the describe endpoint of the target system or application). However, the generated custom components may be incorporated into the code of a dialogue flow that underlies the chatbot application. When the chatbot is operating, the code of the dialogue flow may be executed. Executing the code of the dialogue flow may cause the custom component to be executed. Executing the custom components (once integrated into the dialogue flow of the chatbot application) may cause the chatbot to fetch responses from the application or service, which may be retrieved from the database in response to application logic.

Certain embodiments of the present disclosure relate to a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: accessing a database (e.g., an ADF-BC describe endpoint, or in some cases the application service is not backed by a database) that stores metadata associated with an application (e.g., a cloud-based application), the application being configured to perform one or more services, and the metadata indicating, for each service of the one or more services, one or more input parameters consumed by the service (e.g., data fields that the service is capable of receiving and processing); executing a component class configured to automatically generate one or more custom components for each service of the one or more services, wherein each custom component of the one or more custom components is configured so as to enable a chatbot application to facilitate performance of one or more actions (e.g., get a record from the database, write a variable to a record in the database) associated with the service during a dialogue flow between an end user and the chatbot application. The computer-implemented method also includes in response to executing the component class, loading the metadata (e.g., onto a cache). The computer-implemented method also includes identifying, from the metadata, each service of the one or more services. For each service of the one or more services, the computer-implemented method also includes identifying, from the metadata, each input parameter of the one or more input parameters for the service. The computer-implemented method also includes automatically generating at least one custom component for the service, the custom component defining the one or more actions performable by the chatbot application, the one or more actions being actions that are performable by the service, and the custom component being automatically generated using the one or more input parameters for the service; and invoking a particular service of the one or more service of the application, the particular service being invoked using the chatbot application and the at least one custom component generated for the particular service. Other embodiments of this aspect include corresponding computer systems, apparatus, and computer programs recorded on one or more computer storage devices, each configured to perform the actions of the methods.

One general aspect includes a system, including: one or more data processors; and a non-transitory computer-readable storage medium containing instructions which, when executed on the one or more data processors, cause the one or more data processors to perform operations including: accessing a database (e.g., an ADF-BC describe endpoint) that stores metadata associated with an application (e.g., a cloud-based application), the application being configured to perform one or more services, and the metadata indicating, for each service of the one or more services, one or more input parameters consumed by the service (e.g., data fields that the service is capable of receiving and processing). The system also includes executing a component class configured to automatically generate one or more custom components for each service of the one or more services, where each custom component of the one or more custom components is configured so as to enable a chatbot application to facilitate performance of one or more actions (e.g., get a record from the database, write a variable to a record in the database) associated with the service during a dialogue flow between an end user and the chatbot application. The system also includes in response to executing the component class, loading the metadata (e.g., onto a cache). The system also includes identifying, from the metadata, each service of the one or more services. For each service of the one or more services, the system also includes identifying each input parameter of the one or more input parameters for the service. The system also includes automatically generating at least one custom component for the service, the custom component defining the one or more actions performable by the chatbot application, the one or more actions being actions that are performable by the service, and the custom component being automatically generated using the one or more input parameters for the service. The system also includes invoking a particular service of the one or more service of the application, the particular service being invoked using the chatbot application and the at least one custom component generated for the particular service. Other embodiments of this aspect include corresponding computer systems, apparatus, and computer programs recorded on one or more computer storage devices, each configured to perform the actions of the methods.

One general aspect includes a computer-program product tangibly embodied in a non-transitory machine-readable storage medium, including instructions configured to cause a data processing apparatus to perform operations including: accessing a database (e.g., an ADF-BC describe endpoint) that stores metadata associated with an application (e.g., a cloud-based application), the application being configured to perform one or more services, and the metadata indicating, for each service of the one or more services, one or more input parameters consumed by the service (e.g., data fields that the service is capable of receiving and processing); executing a component class configured to automatically generate one or more custom components for each service of the one or more services, where each custom component of the one or more custom components is configured so as to enable a chatbot application to facilitate performance of one or more actions (e.g., get a record from the database, write a variable to a record in the database) associated with the service during a dialogue flow between an end user and the chatbot application. The computer-program product also includes in response to executing the component class, loading the metadata (e.g., onto a cache). The computer-program product also includes identifying, from the metadata, each service of the one or more services. For each service of the one or more services, the computer-program product also includes identify each input parameter of the one or more input parameters for the service. The computer-program product also includes automatically generate at least one custom component for the service, the custom component defining the one or more actions performable by the chatbot application, the one or more actions being actions that are performable by the service, and the custom component being automatically generated using the one or more input parameters for the service; and invoking a particular service of the one or more service of the application, the particular service being invoked using the chatbot application and the at least one custom component generated for the particular service. Other embodiments of this aspect include corresponding computer systems, apparatus, and computer programs recorded on one or more computer storage devices, each configured to perform the actions of the methods.

According to certain embodiments of the present disclosure, any developer responsible for writing dialogue flows used to control a chatbot can create a chatbot with basic functional knowledge, without needing to know the technical details of the REST service available within the application and how the REST service is implemented. Instead, and as a benefit, the component builder can load the metadata that is exposed by the describe endpoint to automatically generate a component for each service, so that the developer can simply identify which input parameters a service expects in order for the developer to fetch the data he or she seeks to obtain. Additionally, as a benefit, once the code for the component builder is written for a framework, any application built using that framework becomes available for building chatbots, even if the services published from that product were not written with chatbot functionality in mind. Further, the dynamic custom components created to integrate the chatbot into an independent cloud-based application and the corresponding code can be used to integrate chatbots into any other cloud-based applications. Accordingly, this has the benefit of integrating the chatbot application into an application service without having the application developer write code for the integration, thereby enhancing efficiency of the integration and the reliability of the application service when new services or service functionality are added or modified.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1A:
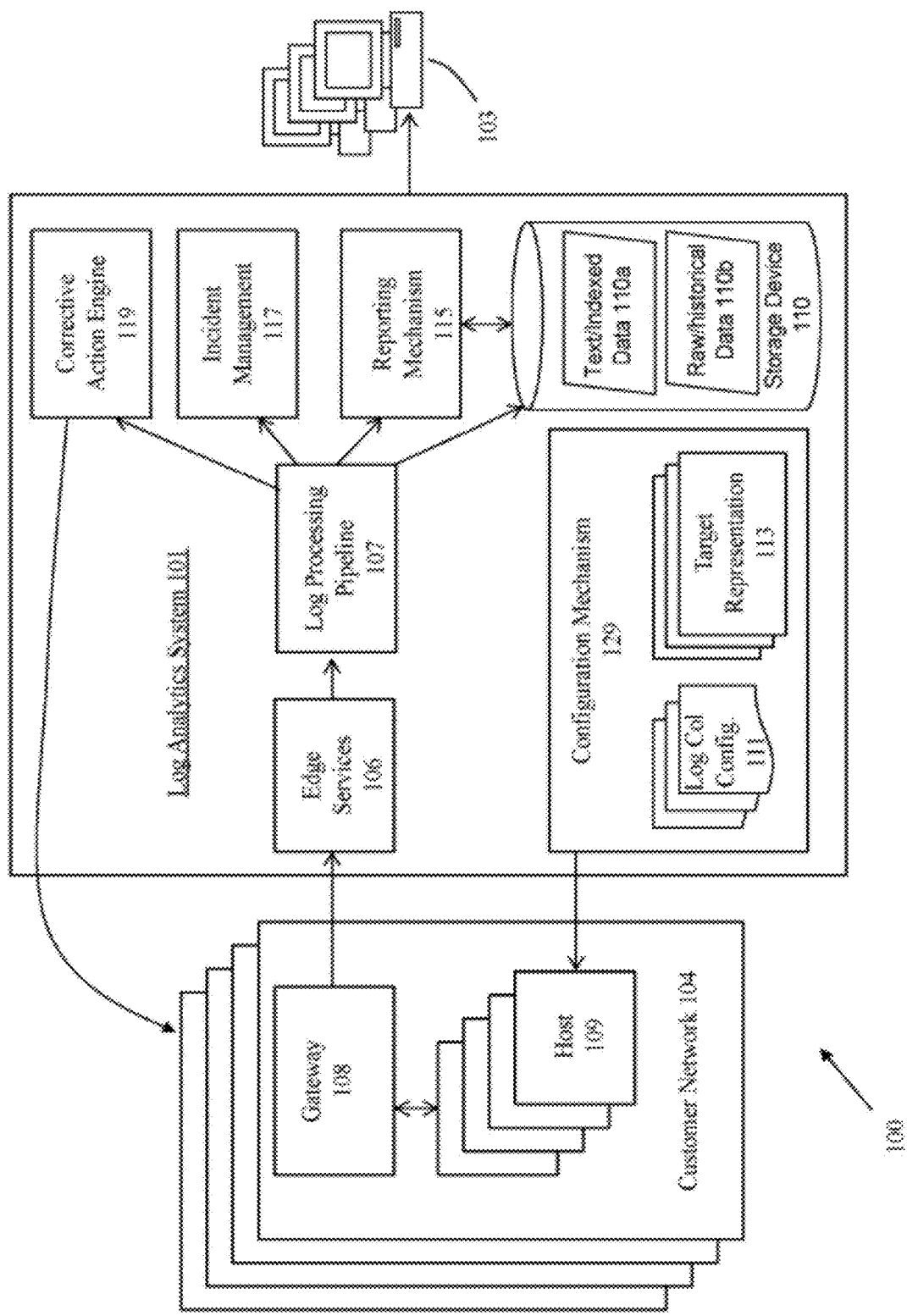
FIG. 1A illustrates an example system for configuring, collecting, and analyzing log data, according to certain embodiments.

A cloud-based chatbot application can deploy an instance of a digital assistant or chatbot into a message channel (e.g., over the Internet). However, the deployed chatbot may be independent from services provided by other cloud-based applications, and thus, the chatbot may not be configured to invoke calls directly to the various application services. The chatbot may not be configured to interact with a service provided by a cloud-based application. In order to interact with the service, a developer would need to write code (e.g., JavaScript) that integrates the chatbot into the cloud-based application. For example, to integrate a chatbot instance into an existing application service, developers had to write code that included custom components that enabled the deployed chatbot instance to directly call the application service with the correct input parameters. Directly calling or invoking the application service from the chatbot application may mean that the dialogue flow of the chatbot would have to be manually coded with the input parameters and/or output parameters that are specific to the input variables of the application service. For example, if the application service is configured to receive any of five different input variables, each input variable of a different variable type (e.g., a string input), then a developer would have to manually hardcode the in configurations of the input and output parameters into the dialogue flow of the chatbot. The process of coding custom components for potentially hundreds of application services of a cloud-based application is a significant technical challenge. Further, any new service or modification to an existing service caused a burdensome and inefficient manual updating of each of the custom components.

Certain aspects and features of the present disclosure relate to systems and methods that integrate a chatbot into an existing application service by automatically and dynamically generating custom components for each application service. The custom components enable the chatbot to efficiently and automatically interact with the application service. In some implementations, the chatbot platform may be configured to host a component generator that discovers all services provided by a target application (e.g., the application to which the chatbot instance is to be deployed and integrated) and automatically generates a custom component for each service provided by the target application. In some implementations, a custom component may be automatically generated for each action performable by the chatbot when integrated into the service. For example, a custom component may be generated for a "get" action that, when invoked or called from the chatbot instance, gets a row of data from the application service based on one or more input variables received from the user communicating with the chatbot. As another example, a custom component may be generated by the "create" action that, when invoked or called from the chatbot instance, creates a record at the application service based on one or more input variables received from the user communicating with the chatbot.

Advantageously, certain embodiments described herein enable a user of the application service to easily integrate a chatbot instance so as to invoke the service directly by the chatbot, which may not otherwise be configured to interact with the service. The custom components may be included in the dialogue flow underlying the chatbot, such that when the chatbot determines that the user's intent is to invoke a service, the custom component can be used to interact with the service using the input parameters and output parameters that are specific to the service. As a non-limiting example, a cloud-based application may require users to complete and submit an online form to request an absence. Integrating a chatbot instance into the cloud-based application, according to certain embodiments described herein, enables the users to communicate with the chatbot to request the absence, instead of completing the online form through the cloud-based application. The questions asked by the chatbot to the user can be configured in the dialogue flow of the chatbot, so that the information requested on the online form is automatically obtained from the user's conversation with the chatbot. Thus, the chatbot can then automatically complete the online form on behalf of the user using the information gathered during the communication session between the chatbot and the user. The chatbot can use the custom component specific to the application to pass the information to the application for processing. For example, the chatbot may detect the intent of the user based on one or more natural language processing techniques. From the detected intent, the chatbot may identify the service that the user seeks to perform. The chatbot can then identify the custom component that corresponds to the service of interest to perform the service. The chatbot can also receive a result of the processing from the application. The information provided by the user during the conversation with the chatbot may also be stored at the application because the chatbot is integrated into the application, thereby enabling the chatbot to invoke the functionality and/or call services of the application.

Additionally, any individual responsible for writing the dialogue flows of the chatbot can create a chatbot without needing to know the technical details of the REST service associated with the target application (e.g., the argument type of the input parameters of the service). The individual can simply look at the signature of the component that is exposed by the component generator (e.g., the input and output parameters that each service is configured to process) to identify which input parameters the service endpoint expects in order to call or invoke the service's functionality directly from the dialogue flow.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each user that needs the service does not need to individually install and configure the service components on the user's own network. The log analytics system 101 is capable of providing the log analytics service to multiple separate users, and can be scaled to service any number of users.

Each user network 104 may include any number of hosts 109. The hosts 109 are the computing platforms within the user network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each user network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the user network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
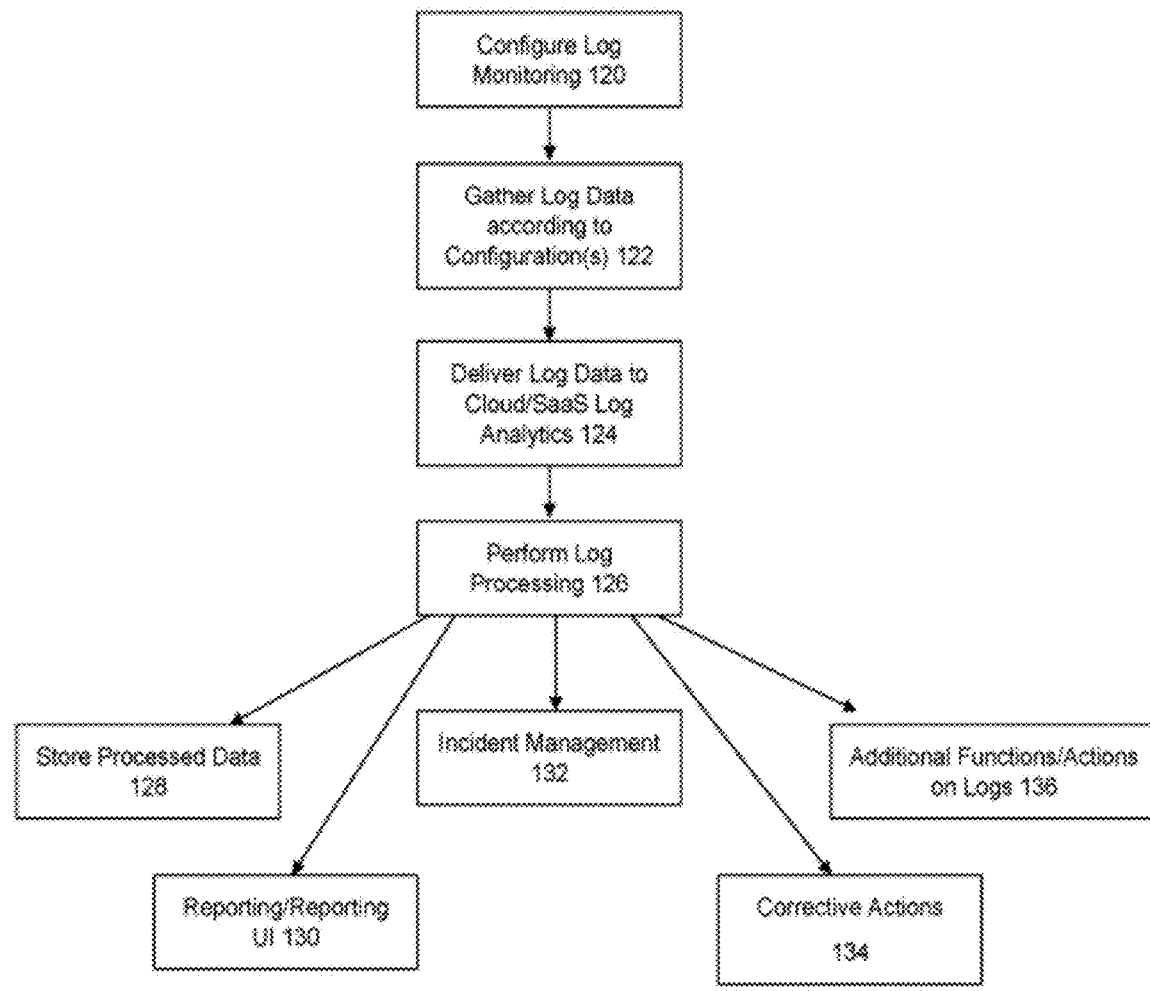
FIG. 1B shows a flowchart of an approach to use a system to configure, collect, and analyze log data, according to certain embodiments.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user to configure the type of log monitoring/data gathering desired by the user. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-ofthe-box rules that are included by a service provider. The log collection configuration 111 may also include user-defined/user-customized rules.

The target representations 113 identify "targets", which are individual components within the user environment that that contain and/or produce logs. These targets are associated with specific components/hosts in the user environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the user network 104 for processing. An agent of the log analytics system is present on each of the hosts 109 to collect data from the appropriate logs on the hosts 109.

In some embodiments, data masking may be performed upon the captured data. The masking is performed at collection time, which protects the user data before it leaves the user network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the user network 104 to the log analytics system 101. The multiple hosts 109 in the user network 104 provide the collected data to a smaller number of one or more gateways 108, which then sends the log data to edge services 106 at the log analytics system 101. The edge services 106 receives the collected data one or more user networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
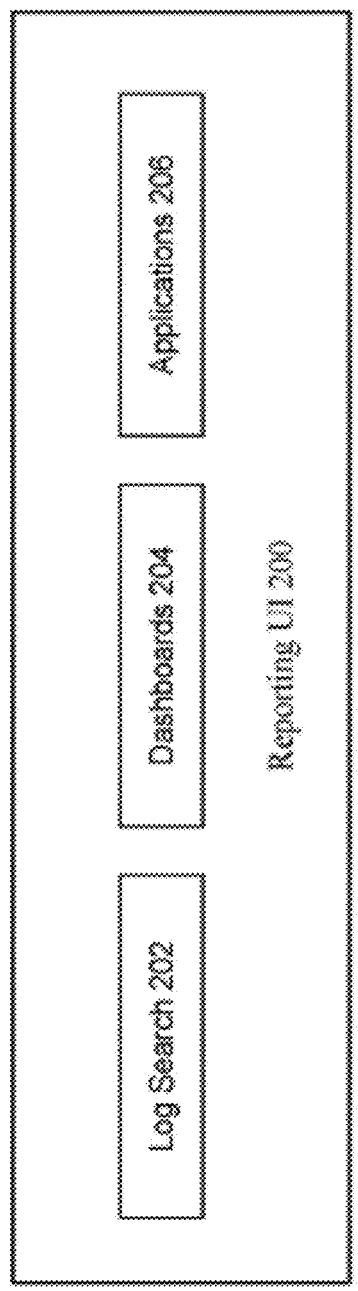
FIG. 2 is a block diagram illustrating components of a reporting user interface (UI), according to certain embodiments.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the user network 104. For example, a log entry may be received that a database system is down. When such a log entry is identified, a possible automated corrective action is to attempt to bring the database system back up. The user may create a corrective action script to address this situation. A trigger may be performed to run the script to perform the corrective action (e.g., the trigger causes an instruction to be sent to the agent on the user network to run the script). In an alternative embodiment, the appropriate script for the situation is pushed down from the server to the user network to be executed. In addition, at 136, any other additional functions and/or actions may be taken as appropriate based at last upon the processed data.

Figure 3A:
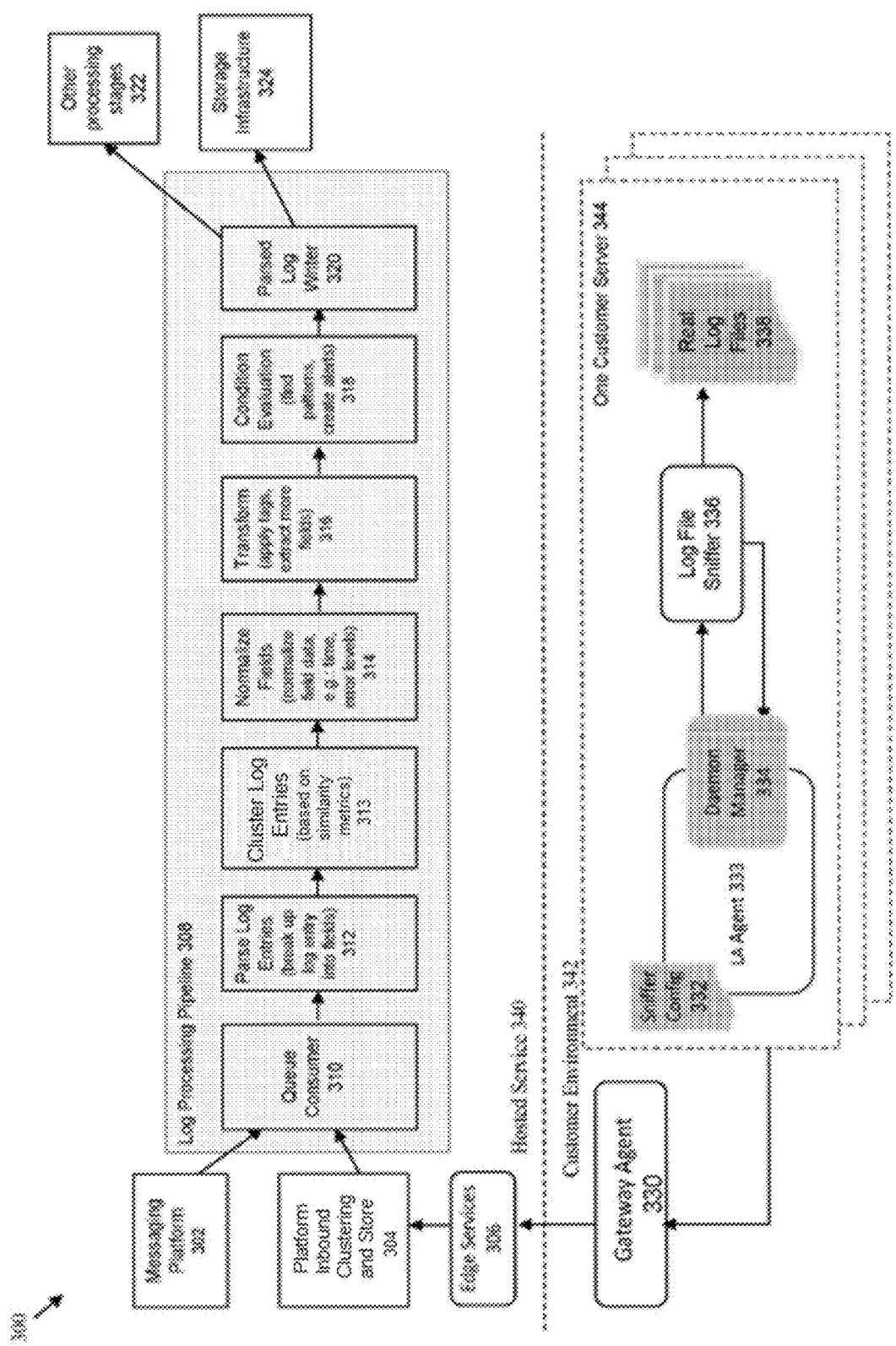
FIG. 3A is a block diagram illustrating an example internal structure of the log analytics system, according to certain embodiments.

FIG. 3A provides a more detailed illustration of the internal structure of the log analytics system at a host environment 340 and the components within the user environment 342 that interact with the log analytics system. This architecture 300 is configured to provide a flow for log monitoring that is able to handle large amounts of log data ingest.

In the user environment 342 within a single user host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple user hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different user environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/users or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
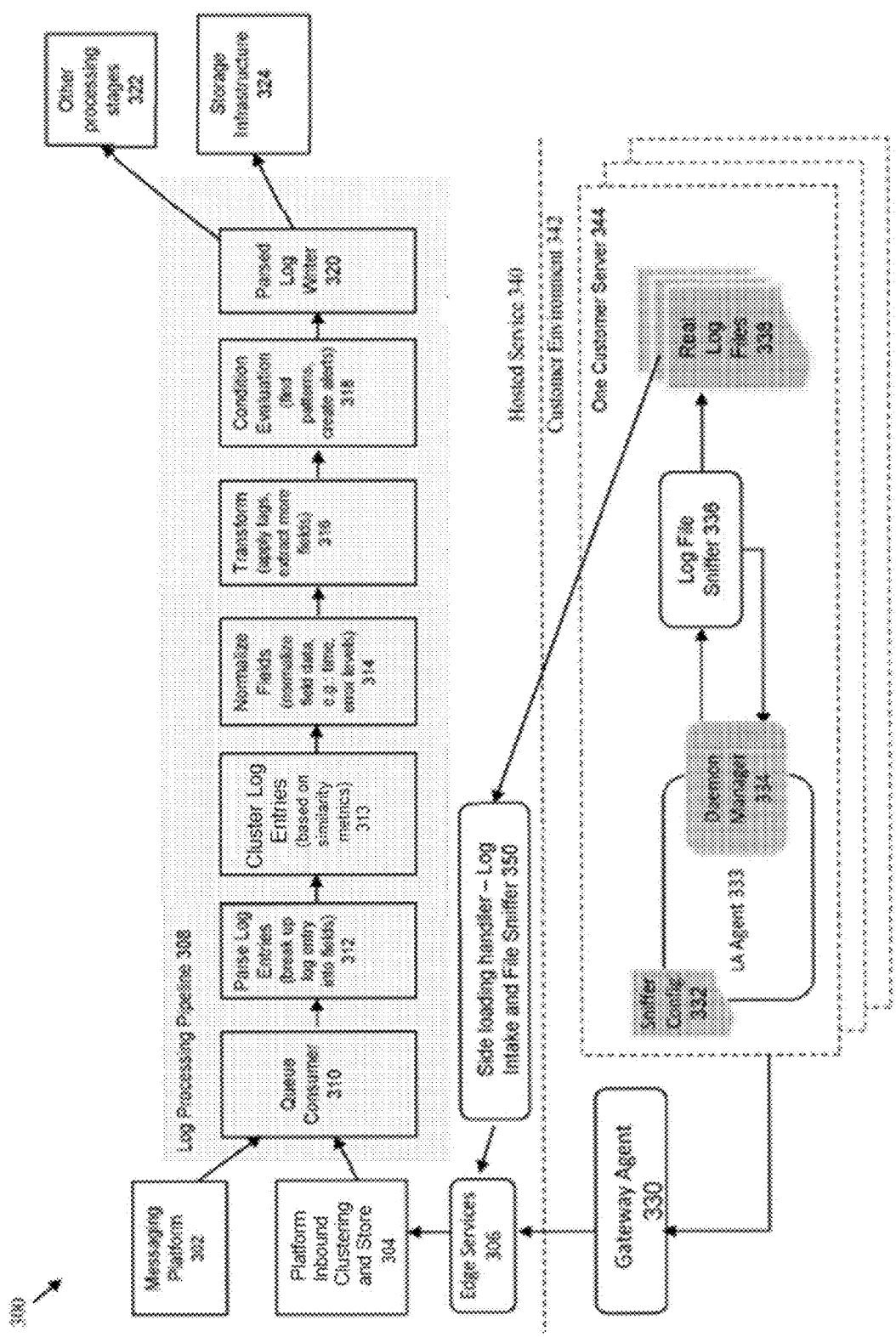
FIG. 3B is a block diagram illustrating an example internal structure of the log analytics system, according to other embodiments.
Figure 3C:
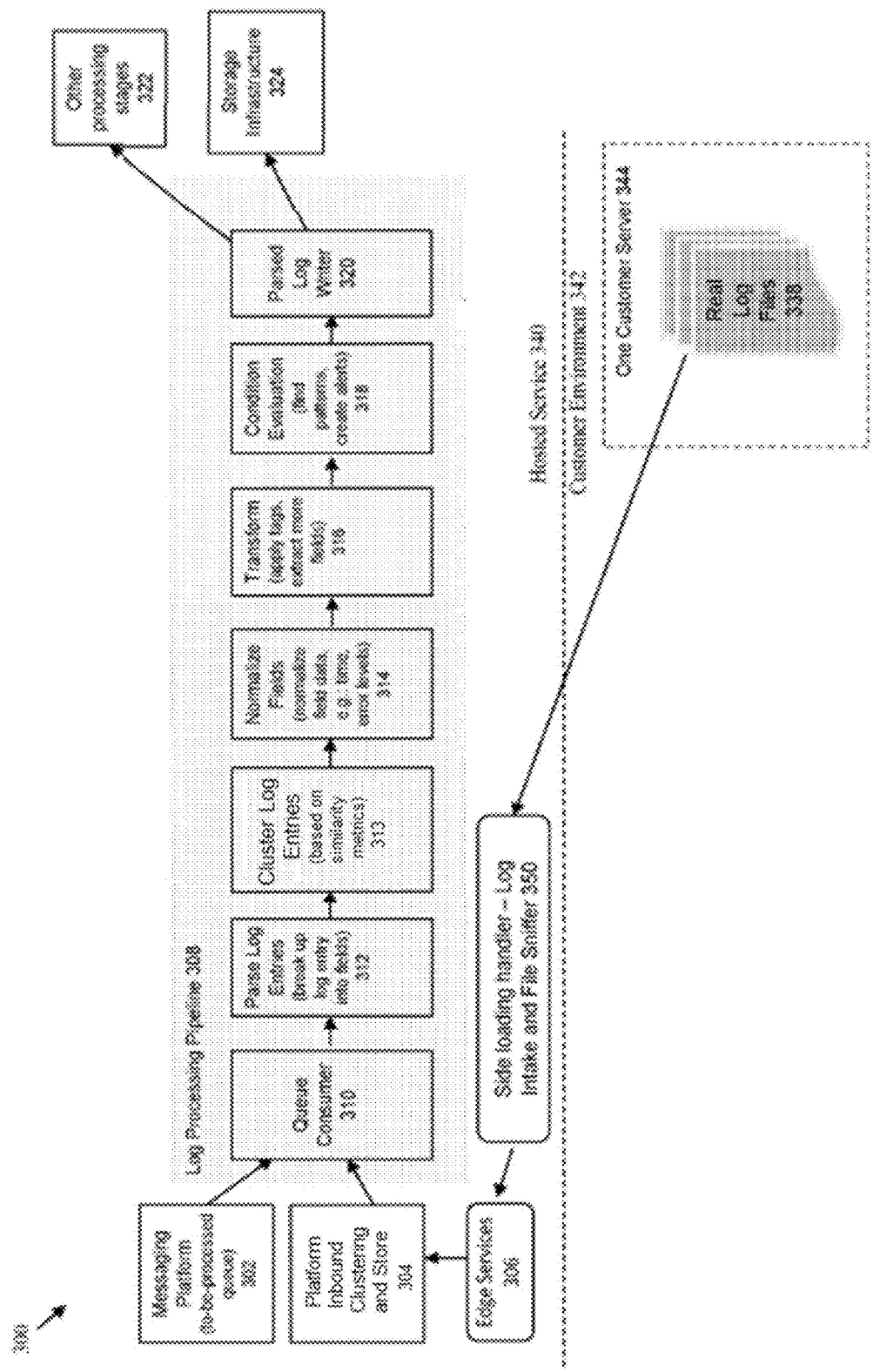
FIG. 3C is a block diagram illustrating an example internal structure of the log analytics system, according to other embodiments.

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Certain embodiments of the present disclosure include systems and methods that integrate a chatbot into an existing application by dynamically building custom components that enable the chatbot to call each of an application's REST services directly from the dialogue flow. Certain embodiments include automatically creating a custom component (e.g., a JavaScript component configured to make REST calls directly from a dialogue flow) for each action that can be performed using a chatbot. The custom component for each action is configured to make a call to the application's back-end services (e.g., a REST service) and to receive and store (as a conversation variable to potentially be displayed in a dialogue flow) a response from the service.

Figure 4:
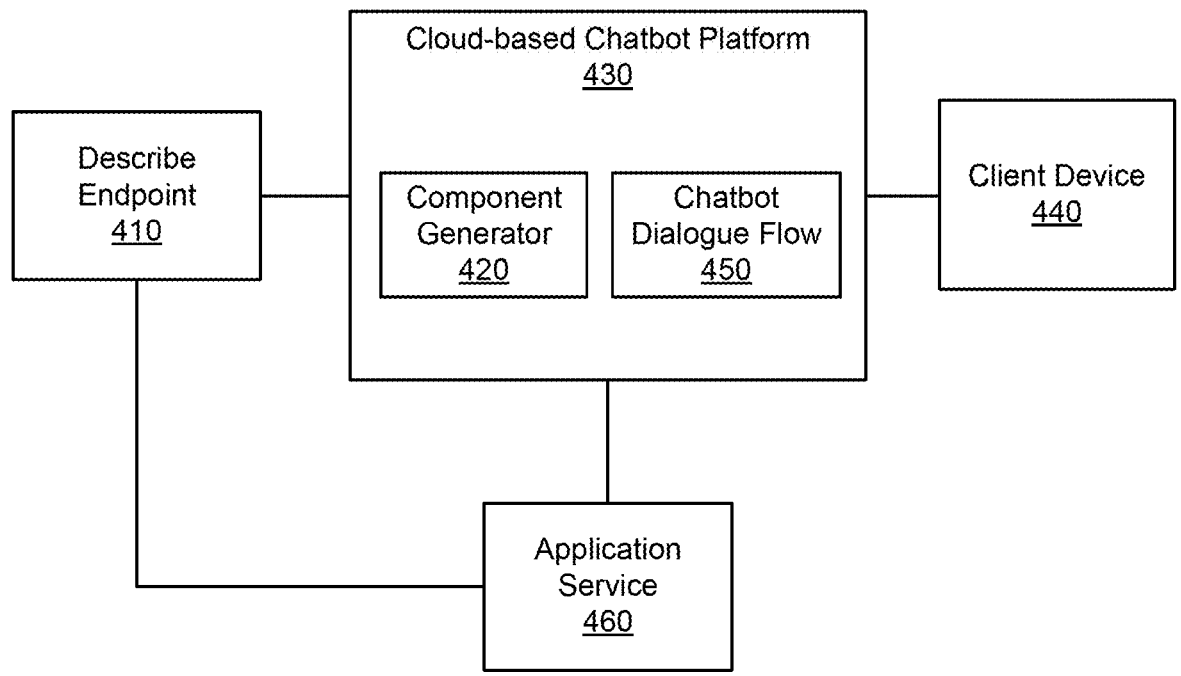
FIG. 4 is a block diagram illustrating an example network environment that dynamically integrates a chatbot into an existing application service, according to certain embodiments described herein.

FIG. 4 is a block diagram illustrating network environment 400 that dynamically integrates a chatbot into an existing application service, according to certain embodiments described herein. In some implementations, network environment 400 may be a sub-network of a larger network of computing devices connected to a public, private, or cloud-based Internet network. In some implementations, network environment 400 may include describe endpoint 410, application service 460, client device 440, and cloud-based chatbot platform 420 (referred to interchangeably as chatbot or chatbot instance).

Describe endpoint 410 may include one or more memory or data storage devices that are configured to store data. In some implementations, describe endpoint 410 may also include one or more processors, on which executable code is stored to manage or process the data stored in the memory. Describe endpoint 410 may store metadata that describes the services provided by a cloud-based application. For example, the metadata may be a document that stores each function as a programming object, which details the input parameters and the output parameters that each function of the service is configured to receive or output, respectively. The metadata may also include the type of input parameters or output parameter, whether the input parameter or output parameter is a required field, and the URL of the service. In some implementations, whenever a service is modified or a new service is added to the application, the metadata is updated to include the input parameters and/or output parameters of the modified or newly-added service. In some implementations, describe endpoint 410 may be a REST service that is accessible by entering a URL by an application or by a browser. The URL, when accessed, may transmit a response to the requesting application or browser. The response may include the metadata associated with the target application.

Application service 460 may be a cloud-based application that is configured to provide one or more services to end users, such as client device 440. As only a non-limiting example, application service 460 may represent Oracle PeopleSoft or Oracle Public Sector application services. Further, application service 460 may include a database server, an application server, and a web server. Application service 460 may also include one or more REST services that are configured to receive an input parameter, generate a response, and transmit the response to the requestor. For example, a REST service included in application service 460 may store a table of information. The REST service may receive a request for certain information in response to a "get" command that was executed at the requestor (e.g., at a chatbot client configured according to embodiments described herein). The row of information may be identified and transmitted back to the requestor.

Cloud-based chatbot platform 430 may be a cloud-based digital assistant application that is configured to deploy an instance of a chatbot to a messaging channel (e.g., a communication session, such as a chat). The deployed instance of the chatbot can be customized by a developer by configuring the dialogue flow of the chatbot. The dialogue flow may be the underlying code of the chatbot. For example, while cloud-based chatbot platform 430 is configured to process natural language text inputted by a user, the developer can customize the text to meet the needs associated with the messaging channel. Cloud-based chatbot platform can be a stand-alone application, as well.

Client device 440 may be any portable (e.g., smartphone, laptop, tablet computer) or non-portable (e.g., desktop computer, electronic kiosk) computing device operated by an end user. In some implementations, client device 440 may run an instance of cloud-based chatbot platform 430. For example, client device 440 may be a laptop running a browser to access the web application of application service 460. In this example, the web application of application service 460 may have integrated an instance of a chatbot and client device 440 is receiving a visual presentation of the chatbot application, with the cloud-based chatbot platform 430 performing the logic and processing. For the chatbot to directly call application service from chatbot dialogue flow 450, component generator 420 automatically creates the custom components needed enable the chatbot platform 430 to directly communicate with application service 460 using the dialogue flow.

In some implementations, cloud-based chatbot platform 430 may include component generator 420, which is configured to automatically generate the custom components needed for chatbot dialogue flow 450 to invoke direct calls to application service 460. Component generator 420 may access describe endpoint 410 to retrieve the metadata that represents application service 460. For example, the metadata representing application service 460 may include all of the input parameters that application service 460 is configured to receive and process. The metadata may also include the type of the input parameter (e.g., a string) and whether or not the input parameter is a required field to perform the service. Additionally, the metadata may also include the output parameters that are outputted by the service. Component generator 420 may load and analyze the metadata to determine which input parameters and output parameters are needed for the chatbot dialogue flow 450 to make direct calls to application service 460. Once the input parameters and output parameters of application service 460 are determined by component generator 420, component generator 420 can execute a custom component builder class that automatically builds the custom components. In some implementations, component generator 420 can automatically generate a custom component for each action that is available in chatbot dialogue flow 450. Component generator 420 may generate a custom component by evaluating the metadata for objects representing functions of the service. For each detected object included in the metadata (e.g., representing a function of the service), component generator 420 may evaluate the input parameters and output parameters (and other information, such as the URL of the service or function) of that function to generate the custom component. As a non-limiting example, the actions that chatbot may perform (by executing dialogue flow 450) can include a "get" command to obtain a record from application service 460, a "create" command to create a record at application service 460, and other suitable commands.

It will be appreciated that component builder 420 may continuously (e.g., periodically on a regular or irregular interval) and automatically discover all of the services included in the metadata stored in describe endpoint 410. Accordingly, in some implementations, when a new service is added to application service 460 or if an existing service of application service 460 is modified, the newly-added or modified service is available to be directly called by chatbot dialogue flow 450 because component generator 420 always has the most up-to-date metadata associated with application service 460. It will also be appreciated that the cloud-based chatbot application may periodically validate the input and output parameters of the application service. Validating the input and output parameters may include checking with the application service that the input and output parameters for an existing service have not been modified or updated. If the cloud-based chatbot application does detect that the input and output parameters for a service have been modified, the cloud-based chatbot application may automatically identify the existing custom component for that service (e.g., using the information available, such as an identifier) and then re-generate the custom component for that service using the modified input and output parameters.

Figure 5:
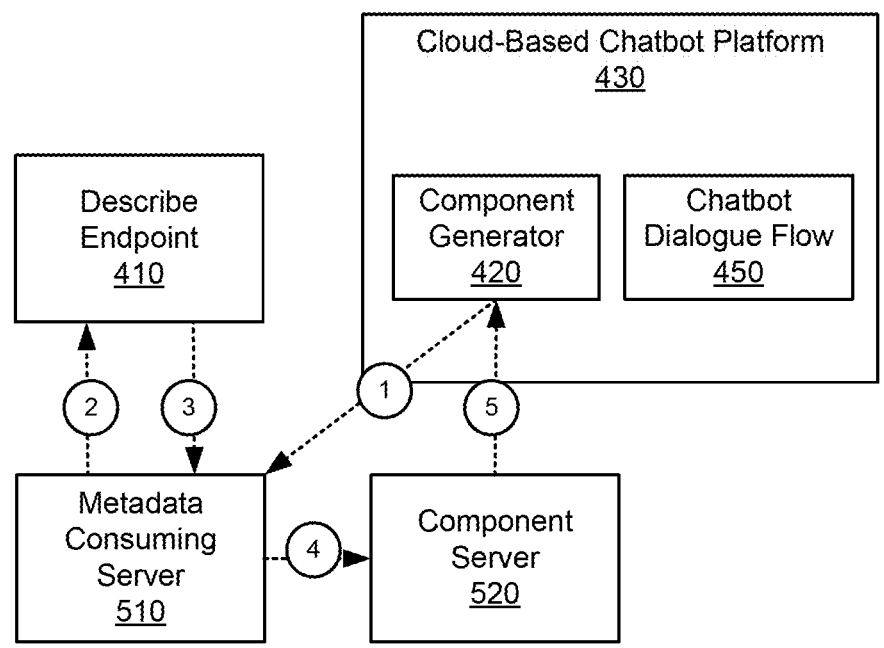
FIG. 5 is a block diagram illustrating another example of a network environment that dynamically integrates a chatbot into an existing application service, according to certain embodiments described herein.

FIG. 5 is a block diagram illustrating another example of a network environment that dynamically integrates a chatbot into an existing application service, according to certain embodiments described herein. Network environment 500 may include a network of servers and databases that facilitate the integration of a chatbot into a cloud-based application. Network environment 500 may include describe endpoint 410, cloud-based chatbot platform 430, metadata consuming server 510, and component server 520. Further, cloud-based chatbot platform 430 may store component generator 420 and chatbot dialogue flow 450. It will be appreciated that component generator 420 may be code that, when executed, triggers the generation of one or more custom components for a service. Generating the one or more custom components may include at least steps 1 through 5 illustrated in FIG. 5.

At step 1, component generator 420 may transmit a signal to metadata consuming server 510. The signal may represent an instruction to metadata consuming server 510 to access a metadata server (e.g., such as describe endpoint 410) that stores the metadata describing the services of a cloud-based application. In some implementations, the signal may represent data indicating a URL of describe endpoint 410. At step 2, metadata consuming server 510 may access describe endpoint 410 (e.g., based on a URL received from component generator 420) to retrieve the metadata associated with the target service (e.g., the service into which the chatbot is intended for integration). For example, the metadata may describe the services of the application, including the input parameters and output parameters for each action or function performable by the service. At step 3, the describe endpoint 410 may transmit the metadata associated with the service to metadata consuming server 510. Metadata consuming server 510 may then process the metadata to identify the functions performable by the service. For example, metadata consuming server 510 may parse through the metadata to identify objects included in the metadata. An object may represent a function performable by the service. For each object detected by metadata consuming server 510, metadata consuming server 510 may parse through the object code to identify or extract data (e.g., properties) associated with the input parameters and the output parameters of that object. For example, metadata consuming server 510 may identify that a name of an input parameter is "get.search.city" and that the parameter type of "get.search.city" is "string." The input parameter "get.search.city" may be used as the input variable when the user provides the name of a city to the chatbot for the purpose of searching permits.

Figure 6:
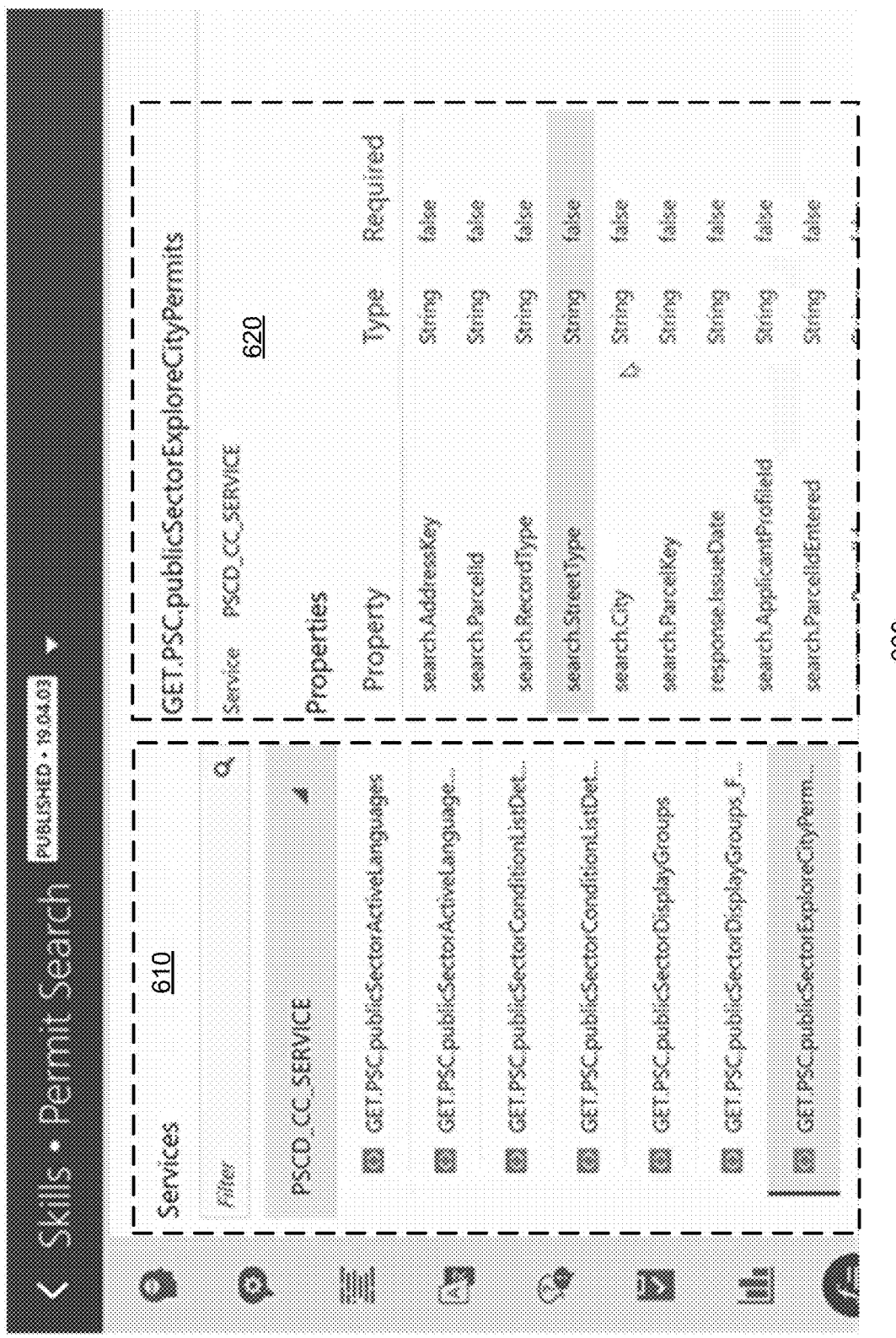
FIG. 6 is an example of an interface configured to display custom components and the corresponding parameters, according to certain embodiments described herein.

At step 4, when metadata consuming server 510 has parsed through the metadata and stored the functions and the corresponding input parameters and output parameters (and any other information characterizing the input parameters and output parameters, such as an argument type) of the service, metadata consuming server 510 may transmit the stored functions and input/output parameters to component server 520. Component server 520 may store a generic custom component that can generate a custom component using the stored functions and the corresponding input parameters and output parameters. For example, the generic custom component may include a framework, outline, or structure of a custom component, into which the detected function and input/output parameters may be inputted to generate a custom component. At step 5, component server 520 may transmit the generated custom component for each action performable by that service to component generator 420 of the cloud-based chatbot application. At this step, the custom components may be available for selection for including into a dialogue flow by a developer, as shown in FIG. 6. It will be appreciated that, in some implementations, any combination of metadata consuming server 510, component server 520, or component server 520 may be stored or hosted on the same server.

FIG. 6 is an example of an interface configured to display custom components and the corresponding parameters, according to certain embodiments described herein. Interface 600 may be an interface presented by the cloud-based chatbot application. Further, interface 600 may display the custom components of a cloud-based application. For example, in panel 610, interface 600 may list each custom component. Each custom component may correspond to a service provided by a cloud-based application. Even for a given service, if the service is performed by more than one action (e.g., a "get" command and an "update command"), custom component generator 420 may generate a custom component for each action. Selecting a custom component in panel 610 may cause the properties associated with that custom component to be presented in panel 620 of interface 600. For example, the properties associated with a custom component may include the input parameters and the output parameters of the service. As another example, the type of the input or output parameter may also be listed in panel 620 (e.g., a "string" value).

Figure 7:
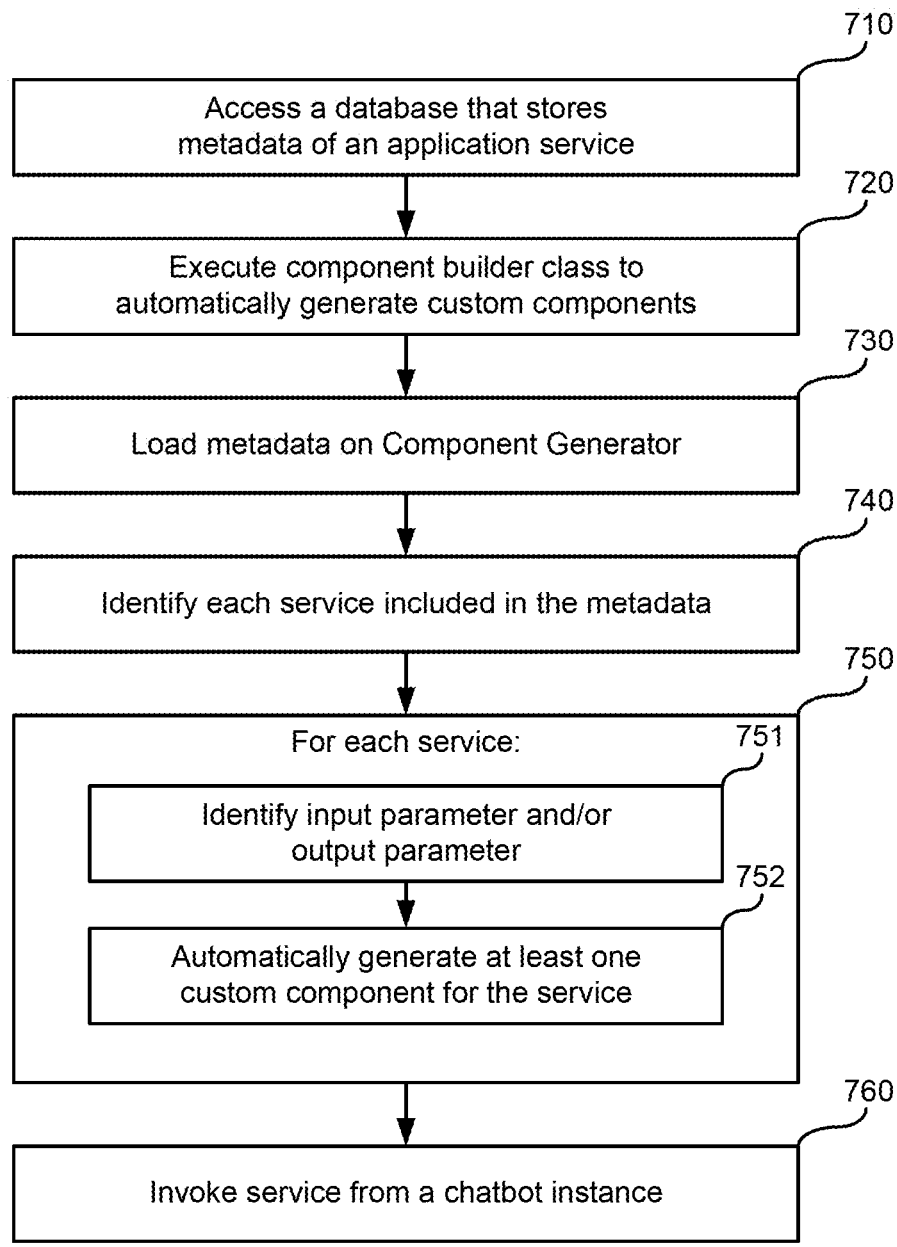
FIG. 7 is a flowchart illustrating an example process for integrating a chatbot into an existing application service, according to certain embodiments described herein.

FIG. 7 is a flowchart illustrating an example process 700 for integrating a chatbot into an existing application service, according to certain embodiments described herein. Process 700 may be performed at least in part by any of the component generator (e.g., component generator 420), the cloud-based chatbot platform (e.g., cloud-based chatbot platform 430), the client device (e.g., client device 440), and/or the application (e.g., application service 460, PeopleSoft, Public Sector Cloud, etc.). Further, process 700 may be performed in order to automatically generate the correct custom components that need to be generated to enable the chatbot instance (that is integrated into the application) to make direct calls to the service of the application within a web browser running on the client device.

Process 700 begins at block 710, where the component generator accesses a database that stores the metadata of an application. In some implementations, the component generator can access a describe endpoint of the application. The describe endpoint may store a document or other metadata that describes the input parameters and output parameters of the application (and their types, and whether or not the parameters are required). In some implementations, the component generator can access any database of the application (e.g., not necessarily a describe endpoint if the application is not configured to use a describe endpoint) to identify the available input parameters and output parameters for the application. In some implementations, the component generator may constantly store the metadata of an application that represents the current state of the input and output parameters of the application. The application may be configured to perform one or more services. In this case, the metadata may indicate the input and output parameters available for each service of the one or more services.

At block 720, component generator may execute a component builder class to automatically generate the custom components needed for a chatbot instance to make direct calls to the service. The custom components are configured so as to enable the chatbot application (e.g., Oracle Digital Assistant) to facilitate performance (e.g., make direct calls to the application from the dialogue flow) of one or more actions available to the service during a dialogue flow between an end user and the chatbot instance.

At block 730, the executing component builder class can access the describe endpoint of the application to retrieve and load the application's metadata onto the component generator. In this case, the application's metadata refers to the document or other metadata that describes the input and output parameters available to the service. At block 540, the component generator can identify each service that is included in the metadata. For instance, a given application can perform multiple services. In order for the chatbot instance to be enabled to make direct calls to each service of the application, the component generator is configured to automatically generate the correct custom components specific to each service (e.g., based on the individual metadata specific to that service).

At block 750, for each service identified in block 740, the component generator may identify the input and output parameters expected by the service (block 751). The component generator can identify the input and output parameters by evaluating the metadata loaded in block 730. At block 752, the component generator may automatically generate at least one custom component for the service. The custom component may define the one or more actions performable by the chatbot instance integrated into the application. For example, the one or more actions may include actions that are performable by the service, and the custom component may be automatically generated using the one or more input parameters and output parameters for the service. In some implementations, the at least one custom component may be stored within the chatbot instance so as to be available when the chatbot instance is instructed (by a user) to make a direct call to the service from within the dialogue flow (e.g., within the chat communication between the user and the chat instance).

At block 760, a particular service of the one or more service of the application may be invoked from within the chat instance. The particular service being invoked may use the chatbot instance and the at least one custom component generated for the particular service to perform one or more actions available to the particular service. As a non-limiting example, a user may operate a client device, and the client device may be running a browser. The user may access a web application that has integrated the chatbot instance. The user may communicate with the chatbot instance from within the browser. Further, the user may cause a direct call to be invoked by answering a question within the dialogue flow of the chatbot instance. For example, the chatbot instance may pose a question to a user: "Please enter your permit number." Once the chatbot instance receives the input of the user's permit number, the chatbot instance can execute the custom components to directly call the service to retrieve information related to the input received from the user (i.e., the user's permit number).

Figure 8:
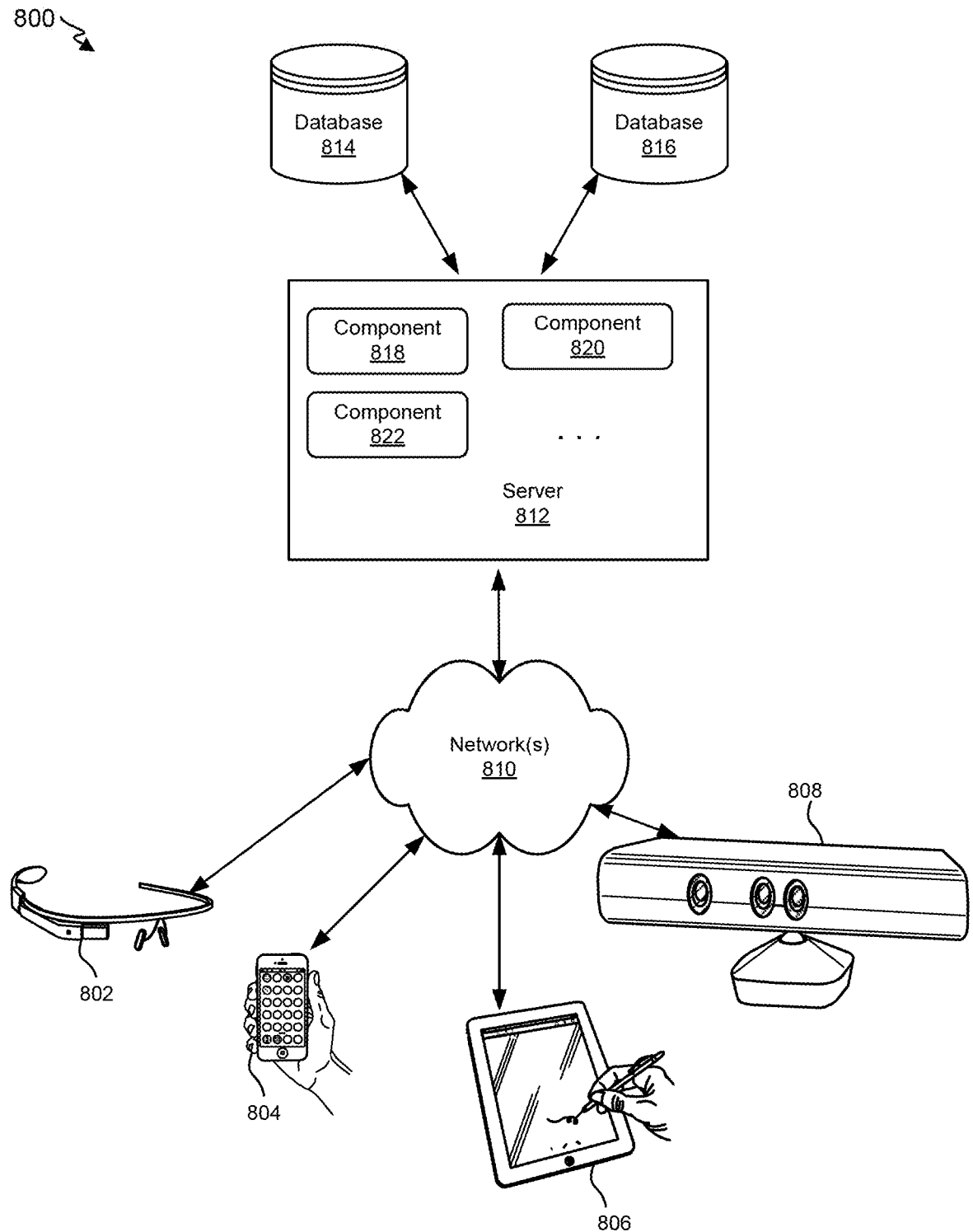
FIG. 8 illustrates a simplified diagram of a distributed system for implementing an embodiment of the present disclosure.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
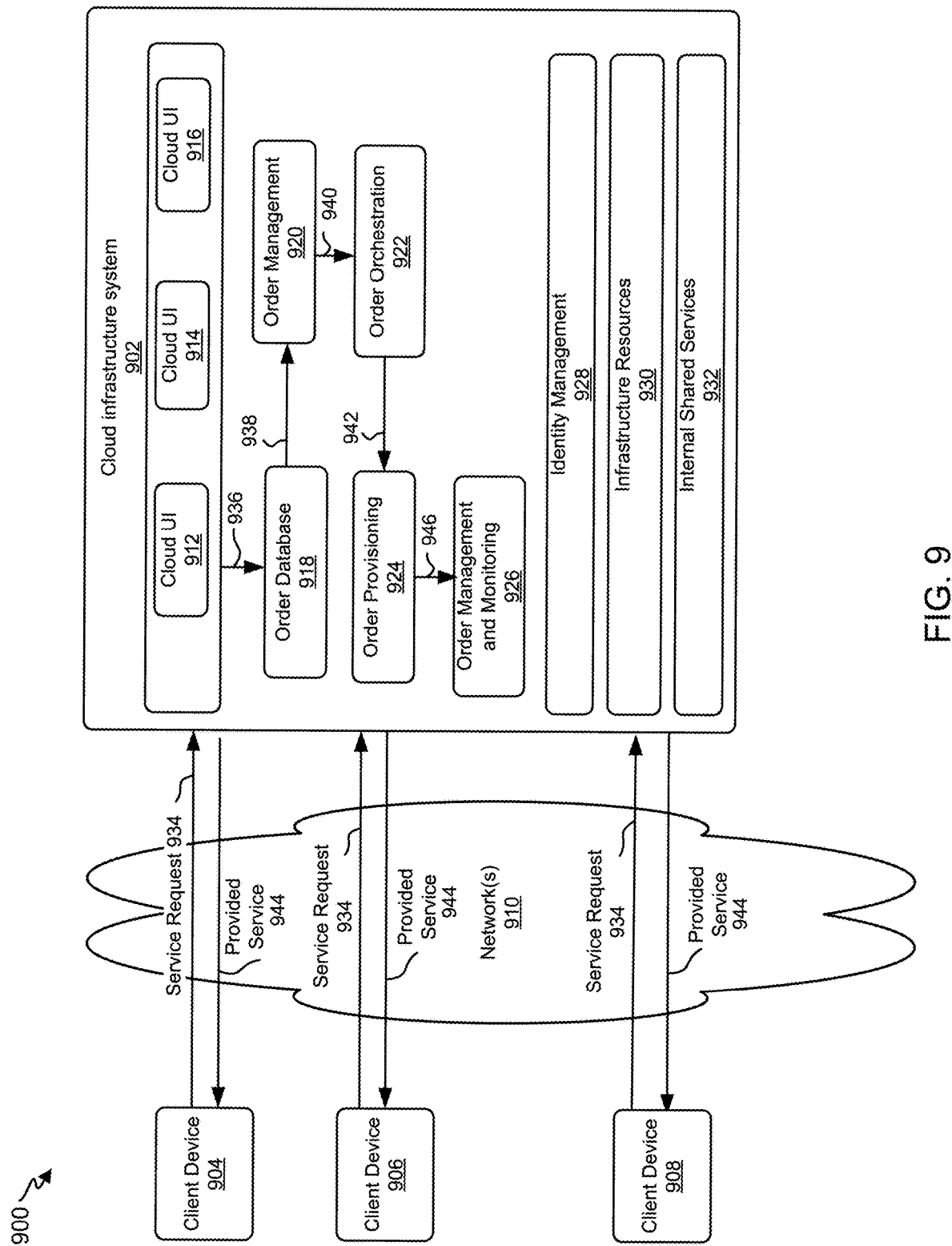
FIG. 9 illustrates a simplified diagram of a distributed system for implementing an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 602, 604, 606, and 608.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the user's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud third-party to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud third-party's web site.

In certain embodiments, cloud infrastructure system 902 may include a suite of applications, middleware, and database service offerings that are delivered to a user in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a user's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A user, via a subscription order, may order one or more services provided by cloud infrastructure system 902. Cloud infrastructure system 902 then performs processing to provide the services in the user's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, users can utilize applications executing on the cloud infrastructure system. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Examples of platform services include, without limitation, Oracle Java Cloud Service (JCS), Oracle Database Cloud Service (DBCS), and others.

By utilizing the services provided by the PaaS platform, users can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer users a Database as a Service in the form of a database cloud. Middleware cloud services may provide a platform for users to develop and deploy various business applications, and Java cloud services may provide a platform for users to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for users utilizing services provided by the SaaS platform and the PaaS platform.

In certain embodiments, cloud infrastructure system 902 may also include infrastructure resources 930 for providing the resources used to provide various services to users of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a user's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a user using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the user may access a cloud User Interface (UI), cloud UI 912, cloud UI 914 and/or cloud UI 916 and place a subscription order via these UIs. The order information received by cloud infrastructure system 902 in response to the user placing an order may include information identifying the user and one or more services offered by the cloud infrastructure system 902 that the user intends to subscribe to.

After an order has been placed by the user, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the user. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the user. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to users on client devices 904, 906 and/or 908 by order provisioning module 924 of cloud infrastructure system 902.

At operation 946, the user's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about users who wish to utilize the services provided by cloud infrastructure system 902. Such information can include information that authenticates the identities of such users and information that describes which actions those users are authorized to perform relative to various system resources (e.g., files, directories, applications, communication ports, memory segments, etc.) Identity management module 928 may also include the management of descriptive information about each user and about how and by whom that descriptive information can be accessed and modified.

Figure 10:
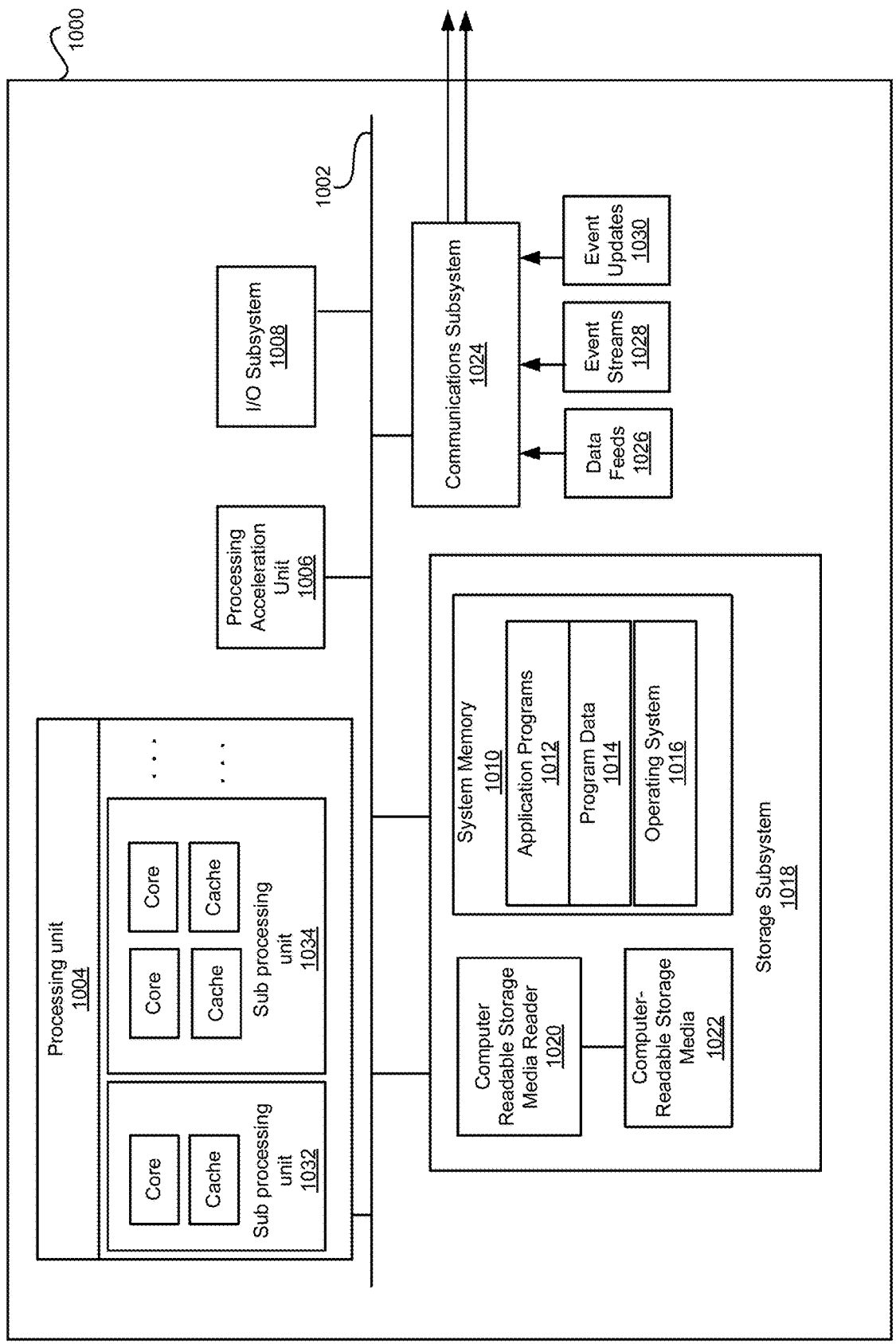
FIG. 10 illustrates an exemplary computer system that may be used to implement an embodiment.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    receiving, by a computing device and via a dialogue flow of a chatbot application, input for invoking a particular service of one or more services of a backend application using the chatbot application, the input comprising one or more particular input parameters in a first defined format;
    executing, by the computing device, a component builder class to generate a custom component for the particular service, wherein the custom component is configured to enable the chatbot application to interact with the particular service via the dialogue flow between an end user and the chatbot application, wherein the particular service is invoked by one or more input parameters for the particular service in a second defined format that is different than the first defined format;
    identifying, by the computing device and in response to executing the component builder class, each input parameter of the one or more input parameters for the particular service;
    generating, by the computing device and using the one or more input parameters, the custom component for the particular service, wherein the custom component defines at least one function performable by the particular service and one or more actions performable by the chatbot application, wherein the one or more actions correspond to the at least one function;
    embedding, by the computing device, the custom component into the dialogue flow of the chatbot application; and
    executing, by the computing device and via the chatbot application, the custom component generated for the particular service to transform the one or more particular parameters from the first defined format into the second defined format.

2. The computer-implemented method of claim 1, wherein the custom component for the particular service enables the chatbot application to communicate with the one or more services.

3. The computer-implemented method of claim 1, further comprising accessing a database that stores metadata associated with an application, the application being configured to perform one or more services, and the metadata indicating, for each service of the one or more services, one or more input parameters consumed by the service.

4. The computer-implemented method of claim 3, further comprising:
    building a payload based on the one or more input parameters included in the metadata;
    invoke the particular service using the payload;
    receiving an output parameter from the particular service;
    storing the output parameter as a conversation variable;
    setting a result state as returned by the particular service; and
    executing a function to display, using the chatbot application, the conversation variable to the end user.

5. The computer-implemented method of claim 1, wherein the one or more particular input parameters include a set of input parameters, and wherein the particular service can be invoked using a subset of the set of input parameters.

6. The computer-implemented method of claim 1, wherein the chatbot application receives input from an end user, the input being in a first defined format, the input corresponding to an input parameter of the particular service, the input parameter of the particular service being associated with a second defined format.

7. The computer-implemented method of claim 6, further comprising:
    executing a component service, the execution of the component service causing the received input to be transformed from the first defined format to the second defined format.

8. A system, comprising:
    one or more data processors; and
    a non-transitory computer-readable storage medium containing instructions which, when executed on the one or more data processors, cause the one or more data processors to perform operations including:
        receiving, by a computing device and via a dialogue flow of a chatbot application, input for invoking a particular service of one or more services of a backend application using the chatbot application, the input comprising one or more particular input parameters in a first defined format;
        executing, by the computing device, a component builder class to generate a custom component for the particular service, wherein the custom component is configured to enable the chatbot application to interact with the particular service via the dialogue flow between an end user and the chatbot application, wherein the particular service is invoked by one or more input parameters for the particular service in a second defined format that is different than the first defined format;
        identifying, by the computing device and in response to executing the component builder class, each input parameter of the one or more input parameters for the particular service;
        generating, by the computing device and using the one or more input parameters, the custom component for the particular service, wherein the custom component defines at least one function performable by the particular service and one or more actions performable by the chatbot application, wherein the one or more actions correspond to the at least one function;
        embedding, by the computing device, the custom component into the dialogue flow of the chatbot application; and
        executing, by the computing device and via the chatbot application, the custom component generated for the particular service to transform the one or more particular parameters from the first defined format into the second defined format.

9. The system of claim 8, wherein the custom component for the particular service enables the chatbot application to communicate with the one or more services.

10. The system of claim 8, wherein the operations further comprise accessing a database that stores metadata associated with an application, the application being configured to perform one or more services, and the metadata indicating, for each service of the one or more services, one or more input parameters consumed by the service.

11. The system of claim 10, wherein the operations further comprise:
building a payload based on the one or more input parameters included in the metadata;
invoke the particular service using the payload;
receiving an output parameter from the particular service;
storing the output parameter as a conversation variable;
setting a result state as returned by the particular service; and
executing a function to display, using the chatbot application, the conversation variable to the end user.

12. The system of claim 8, wherein the one or more particular input parameters include a set of input parameters, and wherein the particular service can be invoked using a subset of the set of input parameters.

13. The system of claim 8, wherein the chatbot application receives input from an end user, the input being in a first defined format, the input corresponding to an input parameter of the particular service, the input parameter of the particular service being associated with a second defined format.

14. The system of claim 13, wherein the operations further comprise executing a component service, the execution of the component service causing the received input to be transformed from the first defined format to the second defined format.

15. A computer-program product tangibly embodied in a non-transitory machine-readable storage medium, including instructions configured to cause a data processing apparatus to perform operations including:
receiving, by a computing device and via a dialogue flow of a chatbot application, input for invoking a particular service of one or more services of a backend application using the chatbot application, the input comprising one or more particular input parameters in a first defined format;
executing, by the computing device, a component builder class to generate a custom component for the particular service, wherein the custom component is configured to enable the chatbot application to interact with the particular service via the dialogue flow between an end user and the chatbot application, wherein the particular service is invoked by one or more input parameters for the particular service in a second defined format that is different than the first defined format;
identifying, by the computing device and in response to executing the component builder class, each input parameter of the one or more input parameters for the particular service;
generating, by the computing device and using the one or more input parameters, the custom component for the particular service, wherein the custom component defines at least one function performable by the particular service and one or more actions performable by the chatbot application, wherein the one or more actions correspond to the at least one function;
embedding, by the computing device, the custom component into the dialogue flow of the chatbot application; and
executing, by the computing device and via the chatbot application, the custom component generated for the particular service to transform the one or more particular parameters from the first defined format into the second defined format.

16. The computer-program product of claim 15, wherein the custom component for the particular service enables the chatbot application to communicate with the one or more services.

17. The computer-program product of claim 15, wherein the operations further comprise accessing a database that stores metadata associated with an application, the application being configured to perform one or more services, and the metadata indicating, for each service of the one or more services, one or more input parameters consumed by the service.

18. The computer-program product of claim 17, wherein the operations further comprise:
building a payload based on the one or more input parameters included in the metadata;
invoke the particular service using the payload;
receiving an output parameter from the particular service;
storing the output parameter as a conversation variable;
setting a result state as returned by the particular service; and
executing a function to display, using the chatbot application, the conversation variable to the end user.

19. The computer-program product of claim 15, wherein the one or more particular input parameters include a set of input parameters, and wherein the particular service can be invoked using a subset of the set of input parameters.

20. The computer-program product of claim 15, wherein the chatbot application receives input from an end user, the input being in a first defined format, the input corresponding to an input parameter of the particular service, the input parameter of the particular service being associated with a second defined format.

* * * * *